United States Patent [19]
Asakura et al.

[11] Patent Number: 5,894,401
[45] Date of Patent: Apr. 13, 1999

[54] TRIMMING CAPACITOR

[75] Inventors: Kyoshin Asakura, Sabae; Syozo Takeuchi, Fukui; Ichiro Nozaki, Souraku-gun, all of Japan

[73] Assignee: Murata Manufacturing Co., Ltd., Japan

[21] Appl. No.: 08/911,160

[22] Filed: Aug. 14, 1997

[30] Foreign Application Priority Data

Aug. 15, 1996 [JP] Japan ................ 8-215659

[51] Int. Cl.$^6$ ............ H01G 4/005; H01G 4/06
[52] U.S. Cl. ............ 361/303; 361/304; 361/311; 361/313; 361/321.1
[58] Field of Search ............ 361/303–305, 361/311–313, 321.1–321.5; 29/25.03

[56] References Cited

U.S. PATENT DOCUMENTS 3,721,871  3/1973  Heron .
5,347,423  9/1994  DeNeuf et al. ............ 361/313

FOREIGN PATENT DOCUMENTS 7183162  7/1995  Japan .

*Primary Examiner*—Bot L. Ledynh
*Attorney, Agent, or Firm*—Ostrolenk, Faber, Gerb & Soffen, LLP

[57] ABSTRACT

A trimming capacitor wherein its trimming direction has no directivity. The trimming capacitor comprises a dielectric ceramic sheet provided with a trimming capacitor electrode on the surface thereof, a dielectric ceramic sheet provided with internal capacitor electrodes on the surface thereof, and other sheets. Regions where the trimming capacitor electrode overlaps with the internal capacitor electrodes are disposed so as to be linearly symmetrical about a base line which is inclined by 45° with respect to a long side of the trimming capacitor. Therefore, the trimming electrode can be trimmed in the same way in either the X or the Y direction of the trimming electrode.

10 Claims, 9 Drawing Sheets

TRIMMING CAPACITOR

BACKGROUND OF THE INVENTION

1. Field of the Invention

The present invention relates to a trimming capacitor and more particularly to a laminated ceramic trimming capacitor.

2. Description of the Related Art

A trimming capacitor is used when electrostatic capacitances of various values are required. For instance, in the example shown in FIGS. 15–20, the trimming capacitor is formed as a laminate 86 by laminating a dielectric sheet 82 on which internal capacitor electrodes 84 and 85 are provided, a dielectric sheet 82 on which a trimming capacitor electrode 83 is provided and a dielectric sheet 82 having no electrode and by sintering them in a body. The laminate 86 is also provided with external electrodes 90 and 91 at both ends thereof as shown in FIG. 16.

Referring to FIG. 17, electrostatic capacitance is mainly generated at parts 87a and 87b (shown by dotted slant lines) where the trimming capacitor electrode 83 overlaps with the internal capacitor electrodes 84 and 85. The electrostatic capacitance generated at the part 87a is represented as C1 and the electrostatic capacitance generated at the part 87b as C2 in this case. The total electrostatic capacitance formed in the trimming capacitor 81 turns out to be a serial connection of C1 and C2 and is expressed by (C1×C2)/(C1+C2).

To adjust the capacitance, part of the trimming capacitor electrode 83 of this trimming capacitor 81 is normally removed by a laser beam L as shown in FIG. 18, to reduce an area thereof facing to the internal capacitor electrode 85 (or the internal capacitor electrode 84) set the electrostatic capacitance to a desired value.

However, in the prior art trimming capacitor 81, the rate of decrease of electrostatic capacitance in response to such a laser trimming operation is not constant, but rather it changes depending on the trimming direction of the laser beam L applied to the trimming capacitor electrode 83. That is, the rate of decrease of the electrostatic capacitance, when the laser beam L is scanned in the direction to remove an edge 83a on the short side of the trimming capacitor electrode 83, is not the same as when the laser beam L is scanned in the X direction to remove an edge 83b on the long side of the trimming capacitor electrode 83 as shown in FIG. 19.

When the edge 83a is removed as shown in FIG. 17, the rate of decrease of the total electrostatic capacitance changes non-linearly as indicated by a solid line 95 in FIG. 20 because only one of the electrostatic capacitances C1 and C2 decreases linearly corresponding to the trimming length (Y direction) and the other will not change. When the edge 83b is removed on the other hand, the rate of decrease of the total electrostatic capacitance changes linearly as indicated by a solid line 96 in FIG. 20 because both electrostatic capacitances C1 and C2 change linearly corresponding to the trimming length (X direction).

Further, unless the length 11 is equal to the length 12 shown in FIG. 17, the trimming length to obtain an electrostatic capacitance of zero is different in the X and Y directions.

From the above reasons, it has been necessary to set the trimming direction per parts corresponding to characteristics of the trimming capacitor 81 and to align the trimming capacitor 81 in the correct direction in accordance to that in trimming the prior art trimming capacitor 81.

Accordingly, it would be advantageous to provide a trimming capacitor which can be trimmed the same length in either direction to obtain a given change capacitance.

SUMMARY OF THE INVENTION

In order to achieve the aforementioned goal, a trimming capacitor of the present invention may comprise:

(a) a ceramic dielectric;

(b) a trimming capacitor electrode provided at least on the surface of or within the ceramic dielectric; and (c) a pair of internal capacitor electrodes provided within the ceramic dielectric which face the trimming capacitor electrode to generate electrostatic capacitance;

(d) wherein regions where the trimming capacitor electrode overlaps with the internal capacitor electrodes are disposed so as to be linearly symmetrical about a base line inclined by 45° to an external side of the trimming capacitor.

By constructing the trimming capacitor as described above, areas where the trimming capacitor electrode overlaps with the internal capacitor electrodes become equal at a portion of the trimming capacitor electrode to be removed by trimming regardless of whether the trimming direction is the X or Y direction, and there will be no difference in the rate of decrease of electrostatic capacitance due to the trimming direction.

Further, preferably, the trimming capacitor is square and one internal capacitor electrode of the pair of internal capacitor electrodes is electrically connected with external electrodes provided on two adjoining side faces of the trimming capacitor, respectively, and the other internal capacitor electrode is electrically connected with external electrodes provided on the two remaining adjoining side faces of the trimming capacitor. By constructing as described above, the trimming capacitor may be mounted on a circuit board or the like without taking the vertical and horizontal directivities of the trimming capacitor into consideration.

Advantageously, in addition, the trimming capacitor electrode and the internal capacitor electrodes may be disposed so as to be symmetrical in the direction of thickness of the trimming capacitor. By constructing as described above, the trimming capacitor may be mounted on a circuit board or the like on either the front or the back of the trimming capacitor.

The nature of the invention, as well as other objects, uses and advantages thereof, will clearly appear from the following description of several embodiments thereof and from the accompanying drawings.

DESCRIPTION OF PREFERRED EMBODIMENTS OF THE INVENTION

Preferred embodiments of a trimming capacitor of the present invention will be explained below with reference to the appended drawings.

First Embodiment: FIGS. 1 through 6

Figure 1:
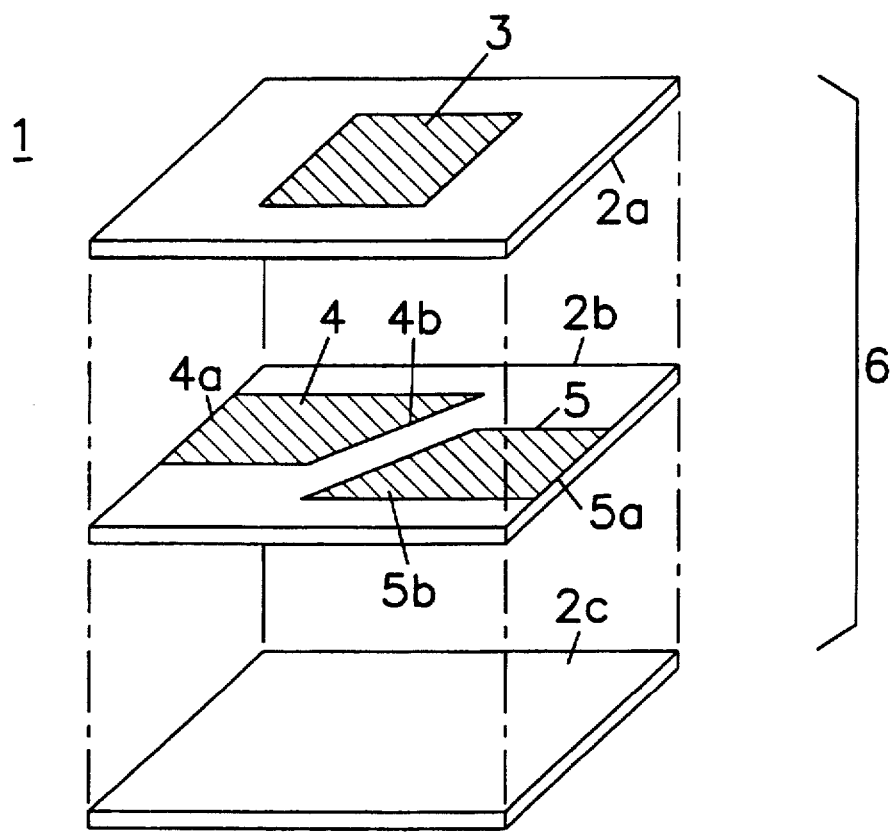
FIG. 1 is an exploded perspective view showing one embodiment of a trimming capacitor of the present invention.

As shown in FIG. 1, a trimming capacitor 1 comprises a dielectric ceramic sheet 2a provided with a trimming capacitor electrode 3 on the surface thereof, a dielectric ceramic sheet 2b provided with internal capacitor electrodes 4 and 5 on the surface thereof, and a dielectric ceramic sheet 2c having no electrode, and others not shown may also be provided. A ceramic material is mixed with a binder or the like and then formed into a green sheet by means of doctor blade in order to make each rectangular dielectric ceramic sheet 2.

The capacitor electrodes 3, 4 and 5 are formed on the surface of the dielectric ceramic sheets, with a conductive paste such as Ag—Pd, Pd, Cu or Ni by means of printing, sputtering or the like. The trimming capacitor electrode 3 is square and is provided in the middle of the surface of the sheet 2a. The internal capacitor electrode 4 is positioned on the left side of the sheet 2b and a lead portion 4a thereof is exposed at the left side of the sheet 2b. The internal capacitor electrode 5 is positioned on the right side of the sheet 2b and a lead portion 5a thereof is exposed at the right side of the sheet 2b. Edges 4b and 5b of the internal capacitor electrodes 4 and 5 are formed at a 45° angle with respect to a long side of the sheet 2b.

The dielectric ceramic sheets 2a, 2b provided with the capacitor electrodes 3 through 5 formed on the surface thereof are laminated with the dielectric sheet 2c having no electrode to form a laminate and are then sintered in a body, to convert the dielectric ceramic sheets 2 into a ceramic dielectric 6.

Figure 2:
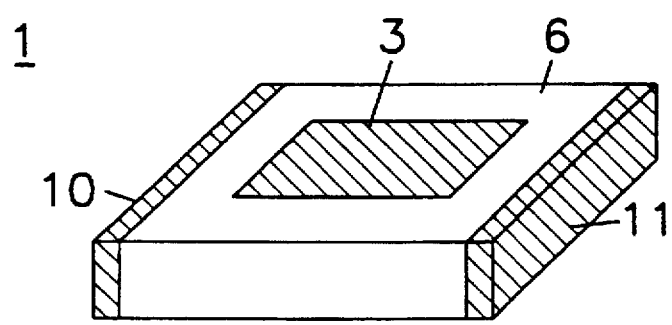
FIG. 2 is a perspective view showing the trimming capacitor shown in FIG. 1.

As shown in FIG. 2, input/output external electrodes 10 and 11 are formed on the right and left end faces of the trimming capacitor 1, respectively. The external electrodes 10 and 11 are formed by means of sputtering, coating or the like and are made of Ag-Pd, Ag, Pd, Cu or Ni materials. The input/output external electrode 10 is electrically connected with the lead portion 4a of the internal capacitor electrode 4 and the input/output external electrode 11 is electrically connected with the lead portion 5a of the internal capacitor electrode 5.

Thus, electrostatic capacitance is generated where parts of the trimming capacitor electrode 3 face the internal capacitor electrodes 4 and 5. The trimming capacitor electrode 3 is formed so as to have a wide area and the initial electrostatic capacitance is normally greater than a desired value thereof.

Figure 3:
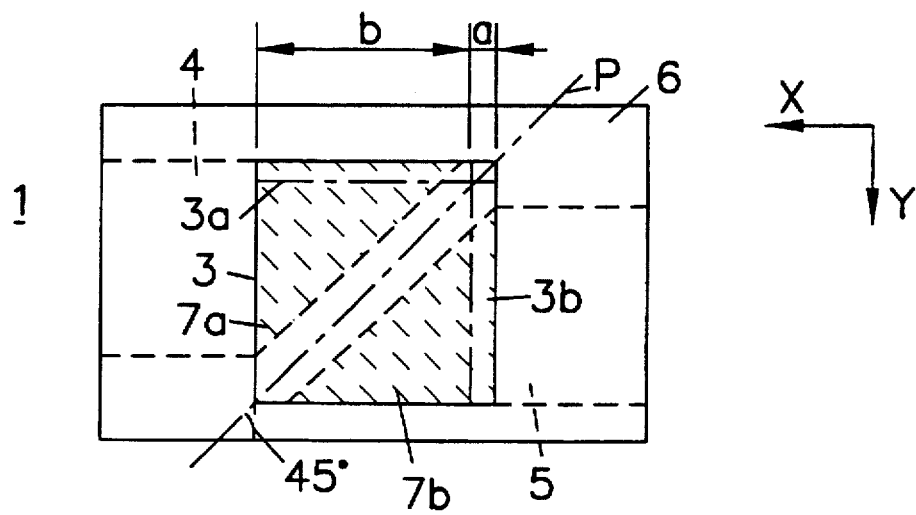
FIG. 3 is a plan view showing a positional relationship between a trimming capacitor electrode and internal capacitor electrodes.

As shown in FIG. 3, the regions 7a and 7b (represented by dotted slant lines) where the trimming capacitor electrode 3 overlaps with the internal capacitor electrodes 4 and 5 are triangular, and are disposed so as to be linearly symmetrical about a base line P whose inclination is 45° with respect to the long side of the trimming capacitor 1.

Figure 4:
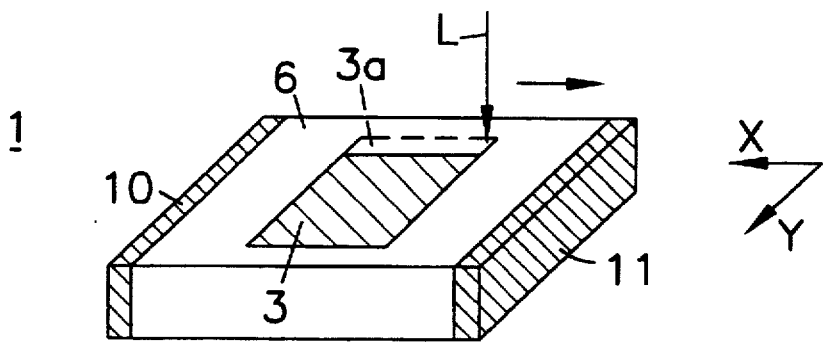
FIG. 4 is a perspective view showing trimming in the direction of X.
Figure 5:
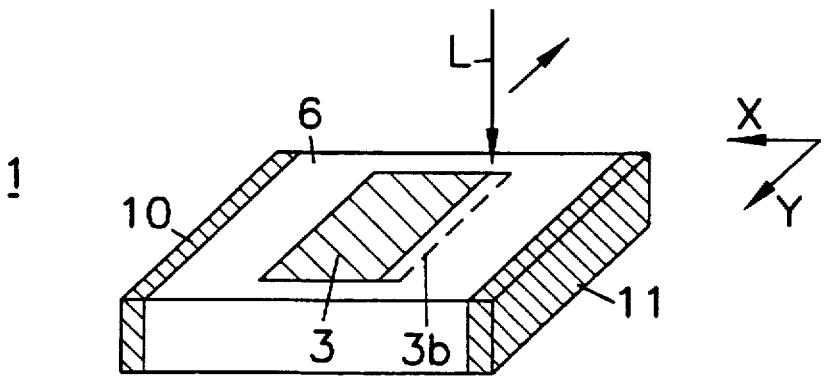
FIG. 5 is a perspective view showing trimming in the direction of Y.

Next, as shown in FIG. 4, a portion of the trimming capacitor electrode 3 is removed and trimmed by directing the laser beam L at the trimming capacitor electrode 3, for example, to finely control the electrostatic capacitance. The rate of decrease of the electrostatic capacitance when the laser beam L is scanned in the direction of the long side (X direction) of the trimming capacitor 1 to remove an edge 3a of the trimming capacitor electrode 3 (i.e., when the electrode 3 is trimmed in the direction of a short side (Y direction) of the trimming capacitor 1) as shown in FIG. 4, is the same as that when the laser beam L is scanned in the direction of the short side (Y direction) of the trimming capacitor 1 to remove an edge 3b of the trimming capacitor electrode 3 (i.e., when the electrode 3 is trimmed in the direction of the long side (X direction) of the trimming capacitor 1) as shown in FIG. 5. This advantageous result is obtained because the decrease of the capacitance C1 and C2 due to the trimming tends to be the same when trimming in the X and Y directions because the regions 7a and 7b where the trimming capacitor electrode 3 overlaps with the internal capacitor electrodes 4 and 5 are linearly symmetrical about the base line P as shown in FIG. 3. It is noted that the trimming distance is increased by scanning the laser beam L a plurality of times, and each time by shifting the scanning position of the laser beam L in the trimming direction, i.e. the direction which the size of the trimming capacitor electrode 3 is being reduced.

Figure 6:
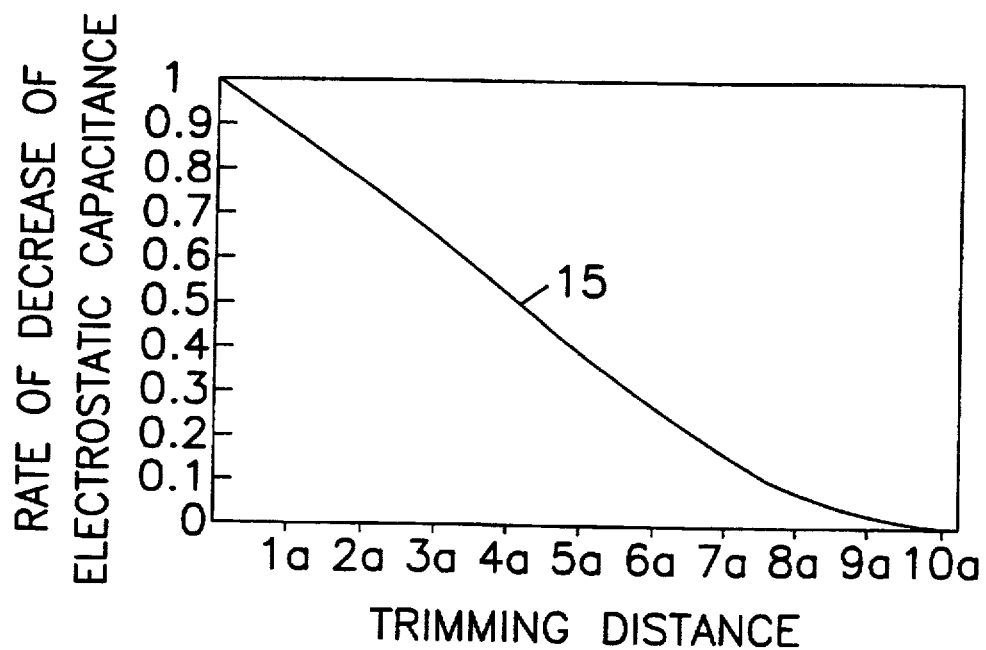
FIG. 6 is a graph showing a relationship between a trimming distance and a rate of decrease of electrostatic capacitance.

FIG. 6 is a graph showing the trimming distance and the rate of decrease of the electrostatic capacitance when a and b are set as shown in FIG. 3, wherein a=(b/10). The decrease in the electrostatic capacitance due to the trimming is defined to be 100%. The rate is equal when laser trimming in the X direction and in the Y direction and is represented by a solid line 15. The area of the trimming capacitor electrode 3 facing the internal capacitor electrode 4 (or the internal capacitor electrode 5) whose edge 3a (or 3b) is removed by the laser beam L is reduced to finely adjust the electrostatic capacitance to a desired value.

As it is apparent from the above, there is no change in the rate of decrease of the electrostatic capacitance regardless of whether the trimming is implemented in the X direction or the Y direction, so that trimming can be implemented without being troubled by the directivity of the X and Y directions.

As a result, it becomes unnecessary to line up each of the parts in order to make the trimming direction uniform, corresponding to characteristics of the trimming capacitor 1.

Figure 7:
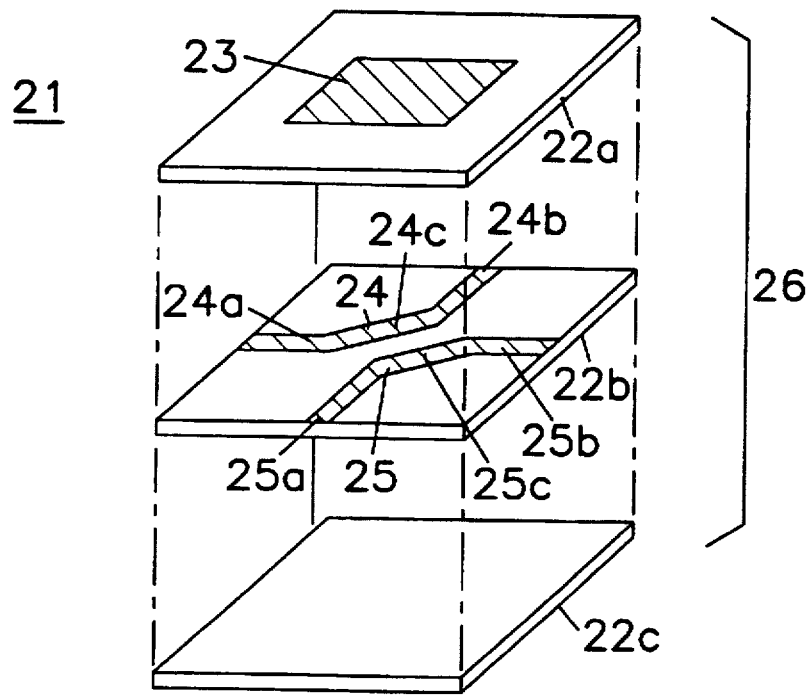
FIG. 7 is an exploded perspective view showing a second embodiment of the trimming capacitor of the present invention.
Figure 8:
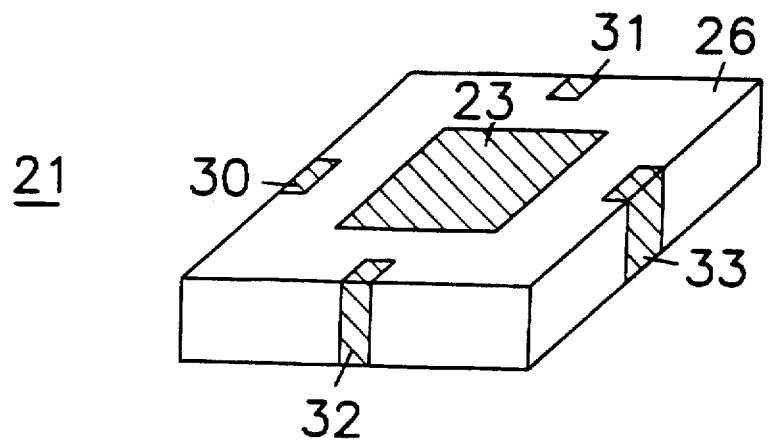
FIG. 8 is a perspective view showing the trimming capacitor shown in FIG. 7.
Figure 9:
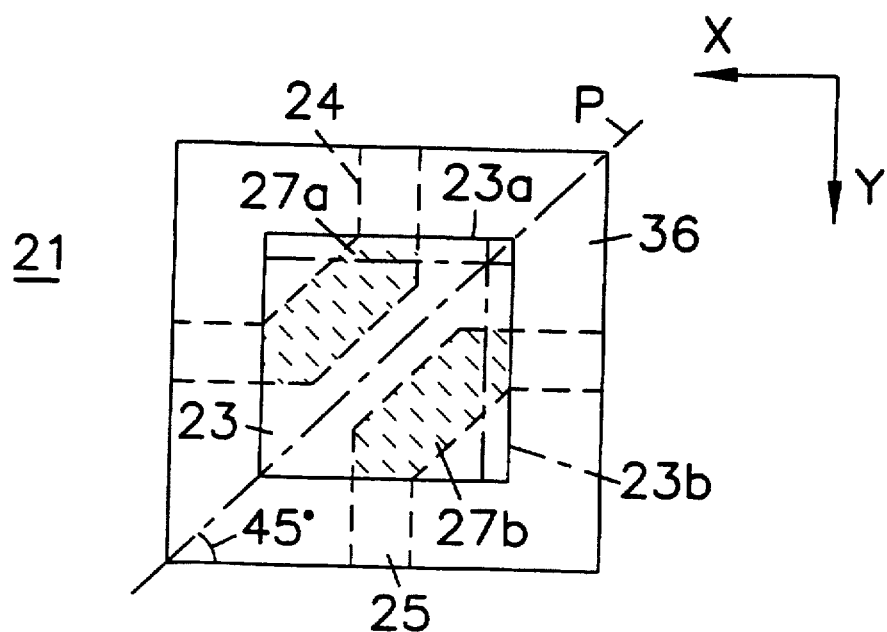
FIG. 9 is a plan view showing a positional relationship between a trimming capacitor electrode and internal capacitor electrodes.

Second Embodiment: FIGS. 7 through 9

As shown in FIG. 7, a trimming capacitor 21 comprises a dielectric ceramic sheet 22a provided with a trimming capacitor electrode 23 on the surface thereof, a dielectric ceramic sheet 22b provided with internal capacitor electrodes 24 and 25 on the surface thereof, a dielectric ceramic sheet 22c having no electrode. Other sheets may also be included. The dielectric ceramic sheets are square.

The trimming capacitor electrode 23 is square and is provided in the middle of the surface of the sheet 22a. The internal capacitor electrode 24 is positioned at the left rear corner of the sheet 22b and lead portions 24a and 24b thereof are exposed at the left side and the rear side of the sheet 22b, respectively. The internal capacitor electrode 25 is positioned at the right corner of the sheet 22b and lead portions 25a and 25b thereof are exposed at the front side and the right side of the sheet 22b, respectively. Middle portions 24c and 25c of the internal capacitor electrodes 24 and 25 are formed to be linearly symmetrical about a line inclined by 45° to one side of the sheet 22b.

The dielectric ceramic sheets 22a, 22b provided with the capacitor electrodes 23 through 25 formed on the surface thereof are laminated with the dielectric sheet 22c having no electrode to form a laminate and are then sintered in a body, to change the dielectric ceramic sheets into a ceramic dielectric 26.

As shown in FIG. 8, input/output external electrodes 30, 31, 32 and 33 are formed on the four side faces of the trimming capacitor 21, respectively. The input/output external electrodes 30 and 31 are electrically connected with the lead portions 24a and 24b of the internal capacitor electrode 24 and the input/output external electrodes 32 and 33 are electrically connected with the lead portions 25a and 25b of the internal capacitor electrode 25, respectively.

Thus, electrostatic capacitance is generated at the regions where the trimming capacitor electrode 23 faces the internal capacitor electrodes 24 and 25.

As shown in FIG. 9, the regions 27a and 27b (represented by dotted slant lines) where the trimming capacitor electrode 23 overlaps with the internal capacitor electrodes 24 and 25 are disposed so as to be linearly symmetrical about a base line P whose inclination is 45° with respect to one side of the trimming capacitor 21.

Next, the trimming capacitor electrode 23 is trimmed to finely control the electrostatic capacitance. The rate of decrease of the electrostatic capacitance when the electrode 23 is trimmed in the Y direction by removing an edge 23a is the same as when the electrode trimmed in the X direction by removing an edge 23b, because the decrease of the capacitance C1 and C2 during the trimming tends to be the same regardless of whether the trimming is in the X or in the Y direction, because the regions 27a and 27b where the trimming capacitor electrode 23 overlaps with the internal capacitor electrodes 24 and 25 are symmetrical about the base line P.

As it is apparent from the above, there is no difference in the rate of decrease of the electrostatic capacitance regardless of whether the trimming is implemented in the X direction or the Y direction, so that trimming can be implemented without being troubled by the directivity of the X and Y directions. Still more, because the trimming capacitor 21 is square and the lead portions 24a and 24b of the internal capacitor electrode 24 are electrically connected with the external electrodes 30 and 31 provided on two adjoining side faces of the trimming capacitor 21 and the lead portions 25a and 25b of the internal capacitor electrode 25 are electrically connected with the external electrodes 32 and 33 provided on the remaining two adjoining side faces of the trimming capacitor 21, the appearance of the trimming capacitor 21, i.e. the arrangement of the external electrodes 30 and 31 and the external electrodes 32 and 33 as well as the outside shape and the like are linearly symmetrical about the base line P. Accordingly, the trimming capacitor 21 may be mounted on a circuit board or the like without having to choose between the vertical and horizontal directions of the trimming capacitor 21.

Figure 10:
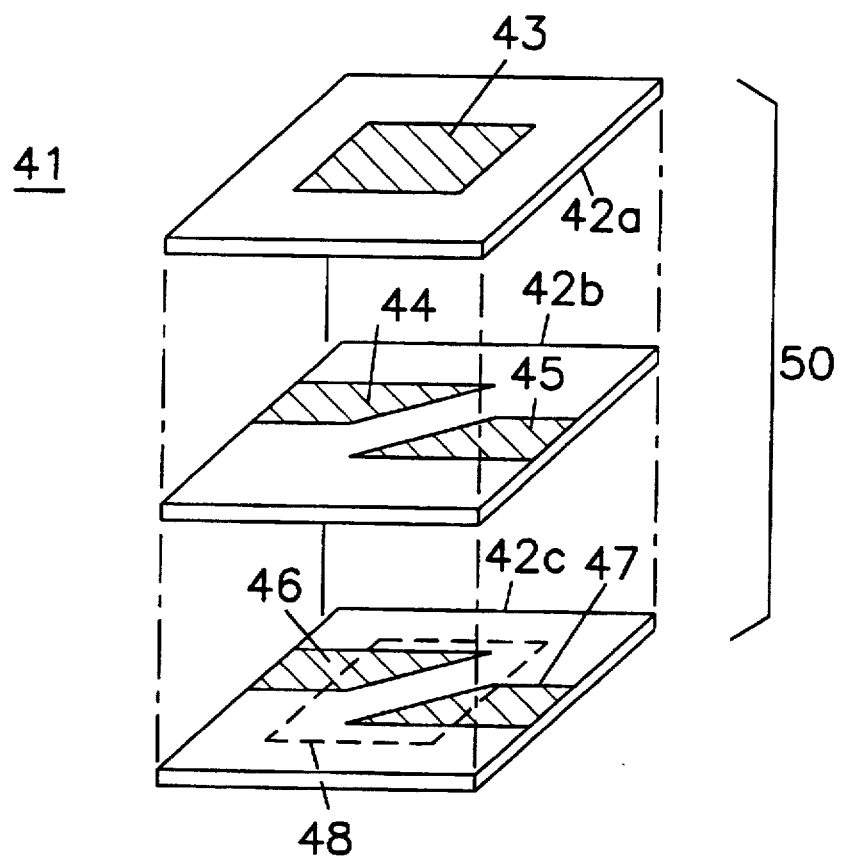
FIG. 10 is an exploded perspective view showing a third embodiment of the trimming capacitor of the present invention.
Figure 11:
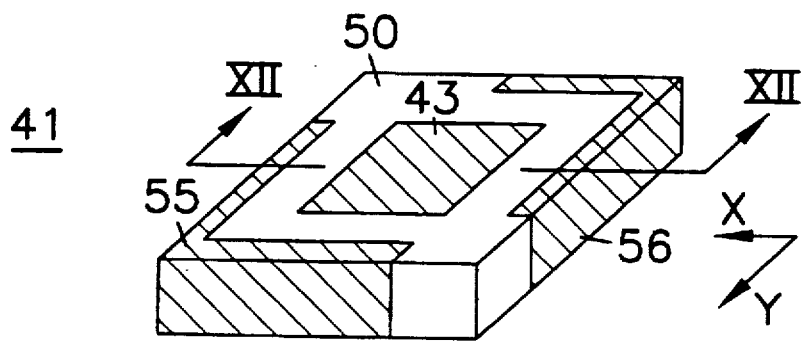
FIG. 11 is a perspective view showing the trimming capacitor shown in FIG. 10.
Figure 12:
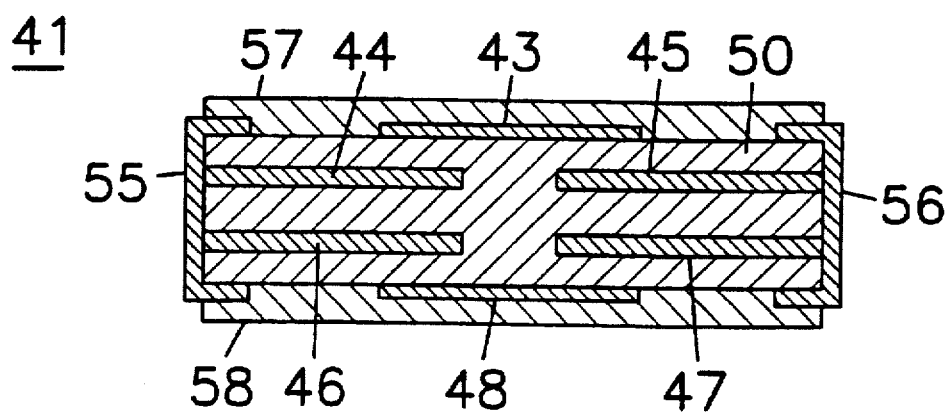
FIG. 12 is a section view along a line XII—XII in FIG. 11.

Third Embodiment: FIGS. 10 through 12

As shown in FIG. 10, a trimming capacitor 41 comprises a dielectric ceramic sheet 42a provided with a trimming capacitor electrode 43 on the surface thereof, a dielectric ceramic sheet 42b provided with internal capacitor electrodes 44 and 45 on the surface thereof, and a dielectric ceramic sheet 42c provided with internal capacitor electrodes 46 and 47 and a trimming capacitor electrode 48 on the front and back faces thereof, respectively. Others may also be included. The dielectric ceramic sheets 42 are square.

Because the trimming capacitor electrodes 43 and 48 and the internal capacitor electrodes 44 through 47 have the same shapes as the trimming capacitor electrode 3 and the internal capacitor electrodes 4 and 5 in the first embodiment described above, their detailed explanation will be omitted here. The dielectric ceramic sheets provided with the capacitor electrodes 43 through 48 are laminated and are then sintered in a body, so that the dielectric ceramic sheets 42 turn into a ceramic dielectric 50.

As shown in FIG. 11, an input/output external electrode 55 is provided across two adjoining side faces of the trimming capacitor 41, and an input/output external electrode 56 is provided across the two remaining adjoining side faces. The external electrode 55 is electrically connected with the internal capacitor electrodes 44 and 46 and the external electrode 56 is electrically connected with the internal capacitor electrodes 45 and 47, respectively. Thus, electrostatic capacitance is generated in the regions where the trimming capacitor electrode 43 faces the internal capacitor electrodes 44 and 45 as well as the regions where the trimming capacitor electrode 48 faces the internal capacitor electrodes 46 and 47.

The regions where the trimming capacitor electrode 43 overlaps with the internal capacitor electrodes 44 and 45 are disposed so as to be linearly symmetrical about a base line P whose inclination is 45° with respect to one side of the trimming capacitor 41. Similarly to that, the regions where the trimming capacitor electrode 48 overlaps with the internal capacitor electrodes 46 and 47 are disposed so as to be linearly symmetrical about the base line P. Therefore, there is no difference in the rate of decrease of the electrostatic capacitance whether the trimming is implemented in the X direction or the Y direction, so trimming can be implemented without being troubled by the directivity of the X and Y directions.

In summary, the trimming capacitor 41 is square, the internal capacitor electrodes 44 and 46 are electrically connected with the external electrode 55 provided on two adjoining side faces of the trimming capacitor 41, and the internal capacitor electrodes 45 and 47 are electrically connected with the external electrode 56 provided on the two remaining adjoining side faces of the trimming capacitor 41. Thus, the arrangement of the external electrodes 55 and 56 as well as the outside shape and the like are linearly symmetrical about the base line P whose inclination is 45° with respect to one side of the trimming capacitor 41.

Further, the trimming capacitor electrodes 43 and 48 are disposed symmetrically and the internal capacitor electrodes 44 and 45 and the internal capacitor electrodes 46 and 47 are disposed symmetrically in the thickness direction, i.e. in the lamination direction, in the trimming capacitor 41, as shown in FIG. 12. Accordingly, the trimming capacitor 41 may be mounted on a circuit board or the like without having to select either the vertical or the horizontal direction of the trimming capacitor 41.

Insulating protection films 57 and 58 for covering the trimming capacitor electrodes 43 and 48 are provided after the trimming capacitor 41 has been trimmed, to prevent the trimming capacitor electrodes 43 and 48 from electrically contacting a conductor on the circuit board. The same material as in the ceramic dielectric 50, or an insulating material such as glass or resin, is used as the material of the insulating protection films 57 and 58. It is needless to say that the protection films 57 and 58 are not always necessary.

Other Embodiments

It is noted that the trimming capacitor of the present invention is not confined only to the embodiments described above and may be modified in various ways, within the scope of the spirit thereof.

Figure 13:
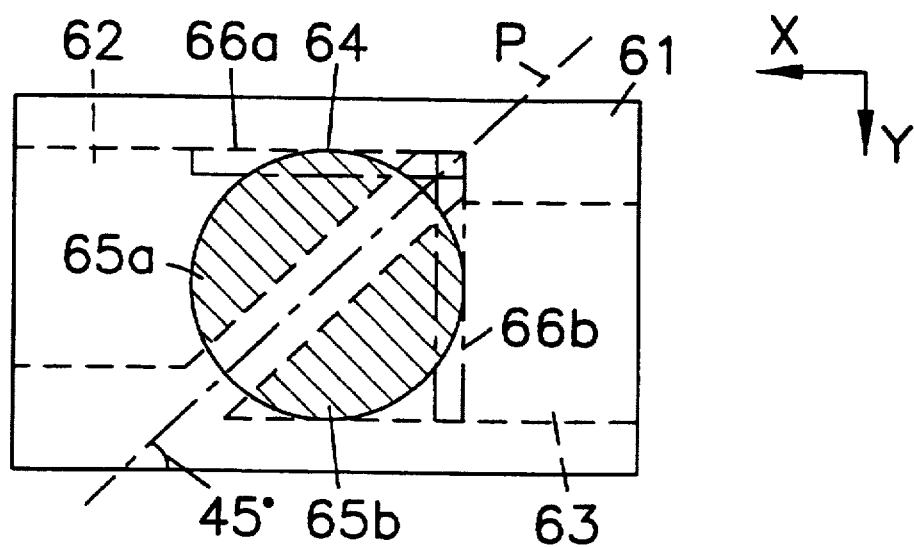
FIG. 13 is a plan view showing a fourth embodiment.

The shape of the regions where the trimming capacitor electrodes overlap with the internal capacitor electrode is arbitrary, so long as they are disposed so as to be linearly symmetrical about the base line P. For instance, it is possible to provide a circular trimming capacitor electrode 64 on the surface of a ceramic dielectric 61 containing a pair of internal capacitor electrodes 62 and 63 and to form regions 65a and 65b (represented by dotted slant lines) where the trimming capacitor electrode 64 overlaps with the internal capacitor electrodes 62 and 63, the regions 65a and 65b being circular segments as shown in FIG. 13. The electrode 64 could then be trimmed either in the area 66a or the area 66b.

Figure 14:
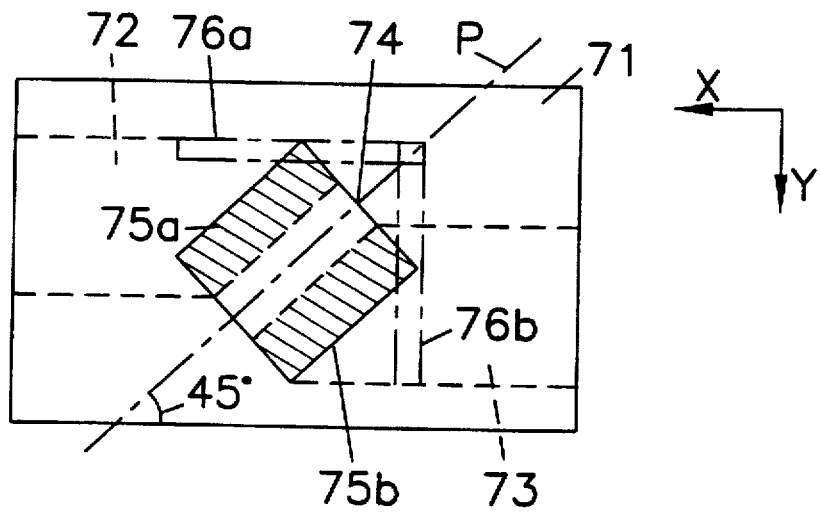
FIG. 14 is a plan view showing a fifth embodiment.
Figure 15:
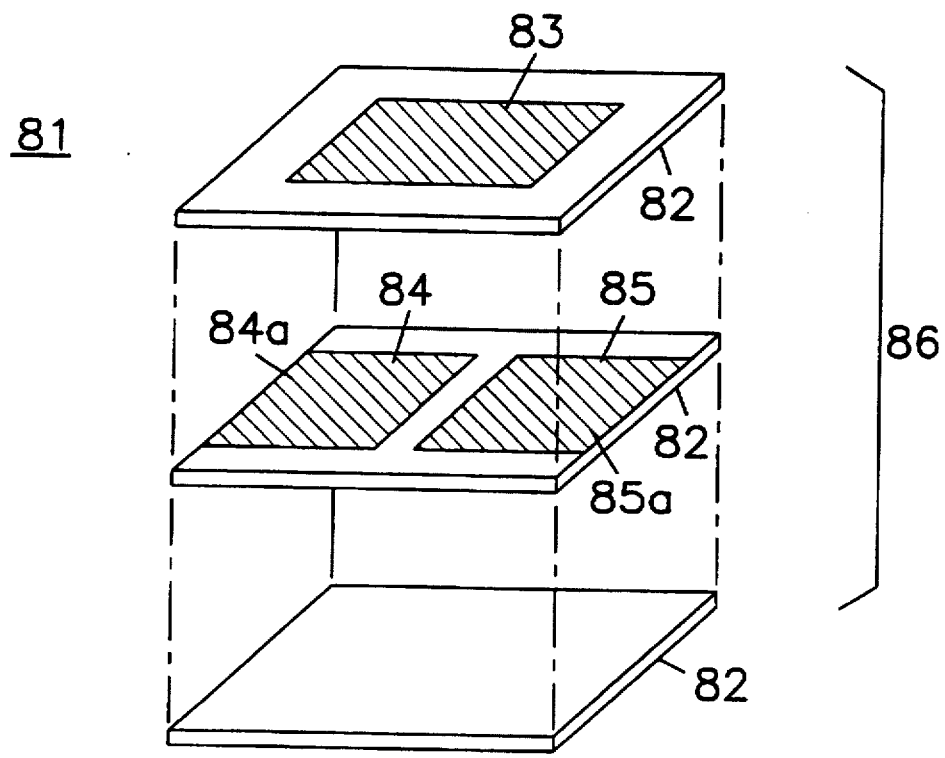
FIG. 15 is an exploded perspective view showing a prior art trimming capacitor.
Figure 16:
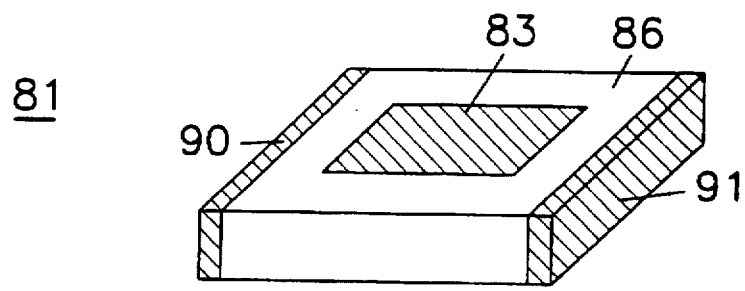
FIG. 16 is a perspective view showing the prior art trimming capacitor.
Figure 17:
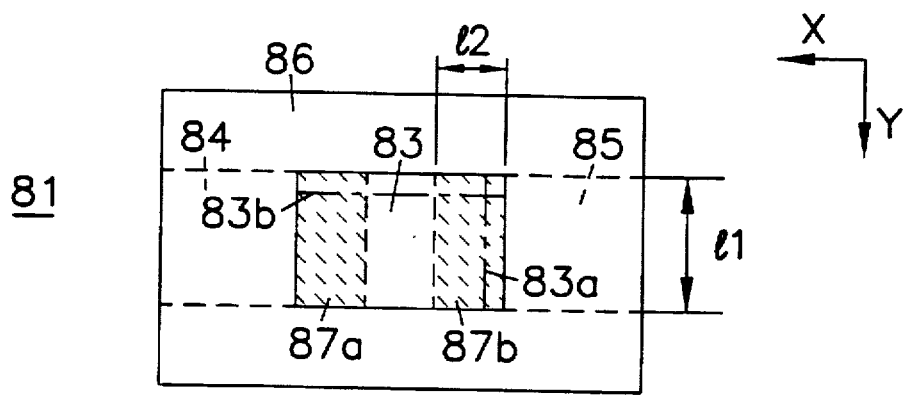
FIG. 17 is a plan view showing a positional relationship between a prior art trimming capacitor electrode and internal capacitor electrodes.
Figure 18:
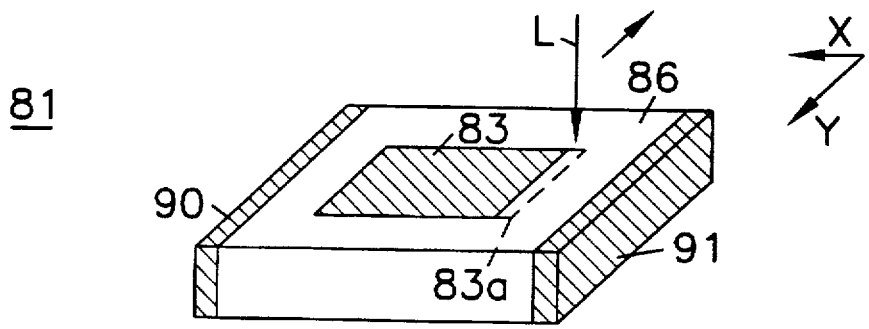
FIG. 18 is a perspective view showing trimming in the direction of Y.
Figure 19:
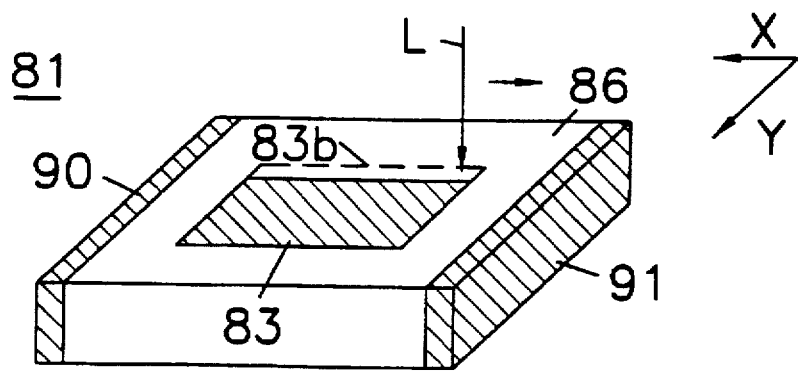
FIG. 19 is a perspective view showing trimming in the direction of X.
Figure 20:
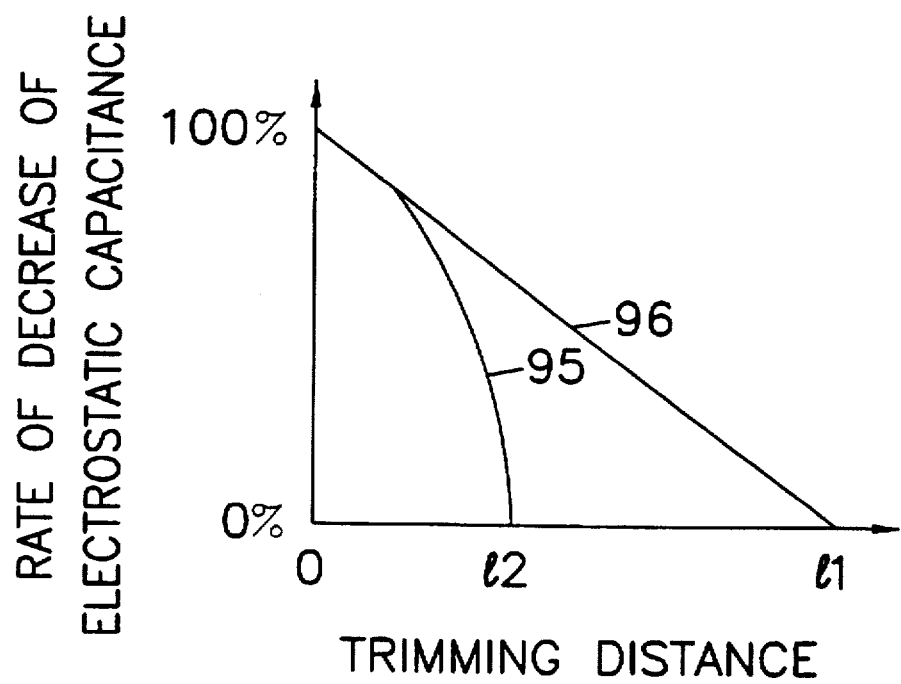
FIG. 20 is a graph showing a relationship between a trimming distance and a rate of decrease of electrostatic capacitance.

Or, it is possible to provide a square trimming capacitor electrode 74 on the surface of a ceramic dielectric 71 containing a pair of internal capacitor electrodes 72 and 73 so that one side thereof is inclined by 45° with respect to one side of the trimming capacitor and to form regions 75a and 75b (represented by dotted slant lines) where the trimming capacitor electrode 74 overlaps with the internal capacitor electrodes 72 and 73, the regions 75a and 75b having a rectangular shape as shown in FIG. 14. The electrode 74 could then be trimmed either in the area 76a or the area 76b.

The rate of decrease of the electrostatic capacitance in the trimmed areas 66a and 76a and the trimmed areas 66b and 76b represented by the dotted chain lines are equal in both cases and the trimming can therefore be implemented without considering directivity.

Although in the foregoing embodiments the trimming has been carried out with the trimming capacitor electrode exposed on the surface of the ceramic dielectric, the present invention is not necessarily confined to that. It is also possible to trim by applying a laser beam, for example, to the surface of a ceramic dielectric in which the trimming capacitor electrode is provided inside, and thereby remove the trimming capacitor electrode together with the surface of the ceramic dielectric, to finely control the electrostatic capacitance. It is needless to say that the trimming capacitor electrode thus exposed on the surface of the ceramic dielectric may be covered by an insulating protection film after the trimming in this case.

As it is apparent from the above description, the parts where the trimming capacitor electrode overlaps with the internal capacitor electrodes are disposed so as to be linearly symmetrical about the base line which is inclined by 45° to the external side of the trimming capacitor in the present invention, so that trimming may be carried out without taking the directivity into consideration.

Further, the trimming capacitor may be mounted on a circuit board or the like without taking the vertical and horizontal directivities of the trimming capacitor into consideration by forming the trimming capacitor into the square shape and by electrically connecting one internal capacitor electrode with the external electrode provided on the two adjoining side faces of the trimming capacitor and by electrically connecting the other internal capacitor electrode with the external electrode provided on the two remaining adjoining side faces of the trimming capacitor.

Still more, the trimming capacitor may be mounted on a circuit board or the like without taking the top and bottom directivities of the trimming capacitor into consideration by disposing the trimming capacitor electrodes and the internal capacitor electrodes so as to be symmetrical in the direction of thickness of the trimming capacitor.

As a result, it becomes unnecessary to line up each of the parts in order to make the trimming direction uniform, corresponding to characteristics of the trimming capacitor and to align the trimming capacitor in the correct direction in accordance with that. Accordingly, it becomes unnecessary to secure the trimming capacitor on a tape in order to set the trimming capacitor on an automatic packaging machine and it becomes possible to deal more simply with loose or bulk products.

While preferred embodiments have been described, variations thereto will occur to those skilled in the art within the scope of the present inventive concepts.

What is claimed is:

1. A trimming capacitor, comprising:
  a ceramic dielectric;
  a trimming capacitor electrode provided on said ceramic dielectric; and
  a pair of internal capacitor electrodes provided within said ceramic dielectric which face said trimming capacitor electrode so as to generate electrostatic capacitance;
  regions where said trimming capacitor electrode overlaps with said internal capacitor electrodes being disposed so as to be linearly symmetrical about a base line which is inclined by 45° to an external side of said trimming capacitor.

2. The trimming capacitor according to claim 1, wherein said trimming capacitor is square and one internal capacitor electrode of said pair of internal capacitor electrodes is electrically connected with external electrodes provided on two adjoining side faces of said trimming capacitor and the other internal capacitor electrode is electrically connected with external electrodes provided on the two remaining adjoining side faces of said trimming capacitor.

3. The trimming capacitor according to claim 2, wherein said trimming capacitor electrode and said internal capacitor electrodes are disposed so as to be symmetrical in the direction of thickness of said trimming capacitor.

4. The trimming capacitor according to claim 1, wherein said trimming capacitor electrode and said internal capacitor electrodes are disposed so as to be symmetrical in the direction of thickness of said trimming capacitor.

5. The trimming capacitor according to claim 1, wherein said trimming capacitor electrode is on a surface of said ceramic dielectric.

6. The trimming capacitor according to claim 1, wherein said trimming capacitor electrode is within said ceramic dielectric.

7. The trimming capacitor according to claim 1, wherein said trimming capacitor electrode is square.

8. The trimming capacitor according to claim 1, wherein said overlap regions have the shape of a triangle.

9. The trimming capacitor according to claim 1, wherein said overlap regions have the shape of a rectangle.

10. The trimming capacitor according to claim 1, wherein said overlap regions have the shape of a circular segment.

* * * * *